3,395,196
OLEFIN DISPROPORTIONATION
Louis F. Heckelsberg, Bartlesville, Okla., assignor to Phillips Petroleum Company, a corporation of Delaware
No Drawing. Filed Nov. 19, 1964, Ser. No. 412,343
1 Claim. (Cl. 260—683)

ABSTRACT OF THE DISCLOSURE

Olefin hydrocarbons are disproportionated by contact with alumina.

---

This invention relates to the disproportionation of olefin hydrocarbons. In one aspect, it relates to a process for disproportionating a hydrocarbon selected from the group consisting of acyclic olefinic hydrocarbons and their aryl derivatives containing from 3 to 16 carbon atoms and mixtures thereof. In one aspect, it relates to a process for disproportionating propylene to produce ethylene and butenes by contact with a catalyst comprising alumina.

By disproportionation, according to this invention, is meant the conversion of a hydrocarbon into similar hydrocarbons of both higher and lower number of carbon atoms. When propylene is disproportionated, approximately equimolar quantities of ethylene and butenes are produced. Such an operation is useful in many instances. For example, a more plentiful hydrocarbon can be converted to a less plentiful and therefore more valuable hydrocarbon.

An object of this invention is to convert an olefin feed to hydrocarbons of higher and lower molecular weight. Another object of the invention is to produce ethylene and butenes from propylene. Other aspects, objects and the advantages of my invention are apparent in the written description and the claims.

According to my invention, the disproportionation of an olefin hydrocarbon is accomplished by contacting the hydrocarbon with a catalyst consisting essentially of alumina.

Olefins which are subjected to disproportionation according to the process of this invention include acyclic olefinic hydrocarbons and their aryl derivatives containing from 3 to 16 carbon atoms and mixtures thereof. The process is advantageously applied to mono-1 and 2-olefins. The conversion of propylene to ethylene and butene is a feature of the invention.

The alumina which is suitable for the preparation of the catalyst can be selected from among those known in the art. The alumina selected should have a surface area and purity suitable to effect the desired conversion. Good results are obtained with a surface area of at least 50 m.$^2$/g. Usually in the practice of the invention the alumina is used without the incorporation of substantial amounts of inert solids and does not contain substantial amounts of impurities. Good results are obtained with aluminas having a purity of at least about 95 weight percent. The alumina can be in any desired form suitable for the contacting method selected including, for example, granules, spheres, microspheres, pellets, tablets, fluid powder, etc. The alumina is made active for disproportionation by treatment with hydrogen or oxygen-containing gas, for example, air, at temperatures of 1000 to 1500° F. for periods of from 0.5 to about 25 hours, shorter times being used at higher temperatures and longer times with lower temperatures. Preferably, the initial activation treatment is followed with a heat treatment in contact with an inert flushing gas such as nitrogen, gas from an inert atmosphere generator (a conventional refinery apparatus in which natural gas or other combustible hydrocarbon gas is burned with a stoichiometric quantity of air, yielding an essentially non-reducing gas mixture), substantially non-reducing flue gases, carbon dioxide, helium, argon, krypton, neon, xenon, radon, or other inert gas. The flushing is carried out at an elevated temperature for a period of about 0.1 to about 10 hours and can conveniently be carried out while cooling the alumina to a suitable storage or reaction temperature. Such inert gases can be used preceding the operation treatment and can be present to a minor degree during the activation treatment. The alumina can be contacted with oxygen-containing gases prior to hydrogen treatment but such contact after hydrogen treatment generally should be avoided. During contact with the alumina, the hydrogen or other gas preferably is in the form of a flowing stream, especially when the alumina is at an elevated temperature. The catalyst can be regenerated by treatments similar to the initial activation treatment. The catalysts of my invention can contain other materials which do not substantially promote undesirable side reactions or substantially reduce the activity of the catalyst to promote disproportionation.

The disproportionation process can be carried out either batch-wise or continuously, using a fixed catalyst bed, stirred batch reactor, a fluidized catalyst chamber, or other suitable contacting techniques. The process can be carried out in vapor or liquid phase at a temperature from 400 to 1200° F., preferably 600 to 1200° F., at pressures of 0–1500 p.s.i.g. In continuous operation, weight hourly space velocities of 0.01–300 wt. feed/wt. catalyst/hour are suitable. In batch reactions, the catalyst comprises about 1 to about 40 weight percent of the reaction mixture and reaction times of about 1 minute to 20 hours are used. If desired, paraffinic or cycloparaffinic hydrocarbons having up to 12 carbon atoms per molecule can be employed as diluents for the reaction.

Following the reaction, conventional methods can be used to separate the hydrocarbon phase from the solid catalyst phase and to recover the products. Techniques such as fractional distillation, solvent extraction, and the like, can be employed for the separation of products. Unconverted feed materials, diluents, or products not in the desired molecular range, can be recycled.

The invention is further illustrated by the following examples.

Example I 8 parts by volume of 20–40 mesh catalytic grade of a commercially available alumina [1] was loaded into a reactor tube and heated in the presence of flowing hydrogen for 3 hours at 1500° F. and then cooled to 200° F. in the presence of flowing nitrogen. 2 parts by volume of glass beads preceded the catalyst bed in the reactor tube.

A stream of propylene was then passed over the catalyst at atmospheric pressure and at a rate of about 0.3 lb. feed per lb. catalyst per hour. At a temperatoure of 600° F., the effluent gases had the following composition when chromatographically analyzed:

| | Wt. percent |
|---|---|
| Ethylene | 0.32 |
| Propylene | 99.15 |
| 1-butene | 0.10 |
| Trans-2-butene | 0.23 |
| Cis-2-butene | 0.14 |

The presence of ethylene as well as butenes in the reactor effluent indicates that the hydrogen treated alumina catalyst is active for disproportionation of propylene.

---

[1] Spectrographic analysis showed the following trace impurities in the alumina, in weight percent as the metal: Ca 0.85, Mg 0.08, Si 0.04, Fe 0.03, Na 0.3, Sr 0.16, Ti 0.03, Ni 0.07, Mn 0.02, B 0.007 and Mo 0.04.

Example II

The run shown in Example I was repeated again except that an alumina having a greater purity was prepared and used.

Solid aluminum isopropoxide was given a simple distillation and 25 parts by volume of the liquid distillate was added with stirring to 500 parts by volume isopropyl alcohol containing 25 parts by volume of water. A white flocculent material precipitated from the solution. This material was filtered and dried to give 50 parts by volume of a white solid.

5 parts by volume of the above solid (20–40 mesh) was loaded into the reaction tube and heated for 1 hour at 1200° F. in air, 15 minutes at 1200° F. in nitrogen, 2½ hours at 1200° F. in hydrogen, and was finally cooled to 200° F. in flowing nitrogen. 2 parts by volume of glass beads preceded the catalyst bed in the reactor tube. The above heat treatments caused the freshly made catalyst bed [2] to shrink to about 3 parts by volume.

Propylene at atmospheric pressure was passed over the catalyst bed at a space rate of about 0.3 lb. feed per lb. catalyst per hour and at different temperatures. The effluent gases were chromatographically analyzed. The results are as follows:

| Temp., ° F | 200 | 300 | 400 | 500 | 600 | 700 | 800 | 1,000 | 1,000 |
|---|---|---|---|---|---|---|---|---|---|
| Ethylene | | | t | t | 0.1 | 0.2 | 0.5 | 1.00 | 0.9 |
| Propane | 0.1 | 0.1 | 0.1 | 0.1 | 0.1 | 0.2 | 0.2 | 1.11 | 1.4 |
| Propylene | 99.9 | 99.9 | 99.9 | 99.8 | 99.5 | 98.5 | 97.2 | 92.83 | 94.0 |
| 1-butene | | | t | 0.1 | 0.3 | 0.9 | 1.9 | 3.72 | 3.0 |
| trans-2-butene | | | | t | t | 0.1 | 0.1 | 0.76 | 0.4 |
| cis-2-butene | | | | t | t | 0.1 | 0.1 | 0.58 | 0.3 |

The data show that the specially prepared alumina after treatment with hydrogen is also active for the disproportionation of propylene.

Example III

The alumina described in Example I was again used in a propylene disproportionation run as described therein except that the alumina was activated in oxygen instead of in hydrogen. The alumina bed, within the reaction tube, was heated in oxygen for 4 hours at 1500° F., cooled to 1000° F. in oxygen, and then cooled to 200° F. in nitrogen. Subsequent propylene conversion at atmospheric pressure and at a space rate of about 0.3 lb. feed per lb. catalyst per hour at several temperatures gave the following effluent analyses in weight percent.

---
[2] Spectrographic analysis showed that the alumina contained about 0.03 weight percent Si as the major impurity.

| Temp., ° F | 400 | 500 | 600 |
|---|---|---|---|
| Ethylene | t | 0.46 | 0.5 |
| Propylene | 100 | 99.22 | 99.0 |
| 1-butene | t | 0.09 | 0.2 |
| trans-2-butene | t | 0.17 | 0.2 |
| cis-2-butene | t | 0.10 | 0.1 |

The data show that disproportionation also occurred with this system which used the oxygen treated alumina as catalyst.

Reasonable variation and modification are possible within the scope of this invention which sets forth a process for converting olefin hydrocarbons to similar hydrocarbons of both higher and lower number of carbon atoms.

I claim:
1. A process which comprises disproportionating propylene to ethylene and butene by contacting propylene with a catalyst consisting essentially of alumina wherein said process is carried out in the vapor phase, said temperature is in the range 600–1200° F., said pressure is in the range of 0–1500 p.s.i.g., and gaseous space velocity is in the range 0.01–300 wt./wt./hr.

References Cited

UNITED STATES PATENTS

| | | | |
|---|---|---|---|
| 2,353,552 | 11/1944 | Drennan | 260—683.2 |
| 3,248,443 | 4/1966 | McEwan et al. | 260—683.2 |
| 2,485,965 | 10/1949 | Voge et al. | 260—666 |
| 2,614,137 | 10/1952 | Chenicek | 260—683 |
| 2,836,629 | 5/1958 | Viola et al. | 260—666 |
| 3,261,879 | 7/1966 | Banks | 260—683 |

OTHER REFERENCES

Hay et al.: Catalytic Butene Isomerization, Industrial and Engineering Chemistry, vol. 41, pp. 2809–2814, 1949.

Oblad et al.: Isomerization of 1- and 2-Pentenes, Industrial and Engineering Chemistry, vol. 39, pp. 1462–1466, 1947.

DELBERT E. GANTZ, *Primary Examiner.*

C. E. SPRESSER, *Assistant Examiner.*